US008547678B2

(12) United States Patent
Bobert et al.

(10) Patent No.: US 8,547,678 B2
(45) Date of Patent: Oct. 1, 2013

(54) SURGE ARRESTER HAVING A SHORT-CIRCUIT DEVICE

(75) Inventors: Peter Bobert, Falkensee (DE); Thomas Westebbe, Berlin (DE)

(73) Assignee: EPCOS AG, Munich (DE)

( * ) Notice: Subject to any disclaimer, the term of this patent is extended or adjusted under 35 U.S.C. 154(b) by 0 days.

(21) Appl. No.: 13/162,215

(22) Filed: Jun. 16, 2011

(65) Prior Publication Data

US 2011/0299211 A1 Dec. 8, 2011

Related U.S. Application Data

(63) Continuation of application No. PCT/EP2009/067307, filed on Dec. 16, 2009.

(30) Foreign Application Priority Data

Dec. 16, 2008 (DE) ......................... 10 2008 062 491

(51) Int. Cl.
*H02H 1/00* (2006.01)

(52) U.S. Cl.
USPC ........... 361/124; 361/120; 361/121; 361/122; 361/123

(58) Field of Classification Search
USPC .................................................. 361/120–124
See application file for complete search history.

(56) References Cited

U.S. PATENT DOCUMENTS

| | | | | |
|---|---|---|---|---|
| 5,644,465 | A * | 7/1997 | Lange et al. | 361/120 |
| 6,172,865 | B1 * | 1/2001 | Boy et al. | 361/119 |
| 6,445,560 | B1 | 9/2002 | Bobert et al. | |
| 2005/0030690 | A1 | 2/2005 | Bobert et al. | |

FOREIGN PATENT DOCUMENTS

| | | | |
|---|---|---|---|
| CN | 1082734 | C | 4/2002 |
| DE | 196 22 461 | B4 | 11/1997 |
| DE | 101 62 916 | A1 | 7/2003 |

* cited by examiner

*Primary Examiner* — Scott Bauer
(74) *Attorney, Agent, or Firm* — Slater & Matsil, L.L.P.

(57) ABSTRACT

A surge arrester includes a short-circuit device. The short-circuit device includes at least one first base element. The first base element is rigidly connected in an electrically conducting and mechanical manner to a first electrode of the surge arrester. The short-circuit device also includes at least one spring arm arranged on the base element. The free end of the spring arm has a distance to the base element, and the spring arm extends over at least two adjoining electrodes of the surge arrester.

20 Claims, 3 Drawing Sheets

SURGE ARRESTER HAVING A SHORT-CIRCUIT DEVICE

This application is a continuation of co-pending International Application No. PCT/EP2009/067307, filed Dec. 16, 2009, which designated the United States and was not published in English, and which claims priority to German Application No. 10 2008 062 491.8, filed Dec. 16, 2008, both of which applications are incorporated herein by reference.

BACKGROUND

The German patent publication DE 196 22 461 B4 discloses a surge arrester with an external short-circuit device.

SUMMARY OF THE INVENTION

In one aspect, the present invention specifies a surge arrester with a short-circuit device that can be produced in a cost-effective fashion and has a compact design.

A surge arrester with a short-circuit device is specified, wherein the short-circuit device is arranged externally on the surge arrester and has at least one base element, which is connected to a first electrode of the surge arrester in an electrically conductive and mechanically secured fashion. The short-circuit device has at least one spring arm that is arranged on the base element of the short-circuit device. The free end of the spring arm is at a distance from the base element and preferably extends over a length of at least two neighboring electrodes of the surge arrester. The tensioning path of the spring arm is preferably at least long enough that it extends over the distance of two neighboring electrodes of the surge arrester.

The base element and the spring arm are electrically interconnected. A web associated with the spring arm connects the un-free end of the spring arm to the base element. The web is preferably arranged above an end-side electrode of the surge arrester and at one end of the base element.

In one embodiment, the spring arm has a length that extends over approximately the entire length of the surge arrester or extends therebeyond. As a result, a spring arm embodied as a thick metal strip can achieve a good spring effect. In the case of a short-circuit device embodied in this way, the short-circuit device has a spring arm made from a thick metal strip. The contact pressure of the spring arm on the electrode to be short circuited is still large enough to guarantee a secure electrical connection between the spring arm and the electrode of the surge arrester if there still are remains of a fusible element between the spring arm and the electrode.

In a preferred embodiment, the short-circuit device comprises an integral component, wherein the component has at least one base element and at least one spring arm. The component is preferably produced from a stamping.

In a preferred embodiment, the base element of the short-circuit device is connected to the central electrode of a 3-electrode surge arrester. The at least one base element is preferably connected in a mechanical and electrical fashion to the first electrode, i.e., the central electrode of the arrester, by means of a welded connection.

In one embodiment, the short-circuit device has at least two spring arms.

However, in another embodiment, the short-circuit device may also have more than two spring arms.

In the embodiment with two spring arms, the two spring arms are preferably arranged on both sides of the base element in the direction of the longitudinal axis of the surge arrester.

In the regular operating mode, both spring arms of the short-circuit device are at a distance from at least a second and a third electrode of the surge arrester. The second and third electrodes are the outer electrodes of a 3-electrode surge arrester. The first spring arm is preferably pretensioned in the direction of the second electrode in order to make contact with the latter in the case of a malfunction, i.e., if there is unacceptably strong heating of the surge arrester. The second spring arm is preferably pretensioned in the direction of the third electrode of the arrester in order to make contact with the electrode in the case of a malfunction. This creates a short circuit between the central electrode and the outer electrodes. The development of the short-circuit device is preferably symmetric, more particularly centrosymmetric, with respect to the center of the development.

The spring arms respectively have at least one free end. Moreover, the spring arms each have a further end with the web, which is connected to the base element of the short-circuit device. In one embodiment, the web is arranged between the further end of the spring arm and the base element on a portion of the base element. The base element preferably has a strip-like shape.

In one embodiment, one or more portions are arranged at the ends of the base element, which portions are preferably arranged perpendicularly with respect to the longitudinal direction of the base element. These portions of the base element make electrical and mechanical contact with the spring arms.

In a further embodiment, two base elements are interconnected over associated portions or webs, with the spring arms preferably being arranged between the base elements.

The short-circuit device preferably has at least two spring arms that are connected to the at least one base element via the webs and the portions of the base element. The spring arms are preferably arranged via webs to the opposite ends of the at least one base element.

In a regular operating mode, each spring arm, in the region of the free end thereof, is kept at a distance from at least one electrode of the surge arrester by means of an element made of an easily fusible material.

The first spring arm of the short-circuit device is preferably kept at a distance from the second electrode by means of an element made of an easily fusible material. The second spring arm of the short-circuit device is preferably kept at a distance from the third electrode of the arrester by means of an element made of an easily fusible material.

In the aforementioned embodiment, the pretensioned spring arms are kept at a distance from the outer electrodes of the arrester by means of elements made of fusible material. In one embodiment for 3-electrode arresters, the pretensioned spring arms are also at a distance from the central electrode of the arrester. However, the spring arms have an electrically conductive connection to the first electrode, the central electrode of the arrester, at least via the base element.

In one embodiment, the element made of fusible material comprises an electrically insulating material such as, e.g., a polymer.

In a further embodiment, the element made of fusible material comprises an electrically conductive material such as, e.g., a soft solder.

However, the element made of fusible material can also comprise other materials that are suitable for reliably initiating the short-circuit device in the case of an unacceptably strong heating of the surge arrester.

In the embodiment in which the element made of fusible material comprises a soft solder, the element is preferably arranged between one of the portions of the base element and the spring arm. In the case of a 3-electrode surge arrester the solder may be arranged between the central electrode and the spring arm.

In an embodiment in which the element made of fusible material comprises a polymer or an electrically insulating material, the element can also be arranged between the spring arm and a portion of the base element.

In the embodiment in which the element made of fusible material is arranged between the spring arm and an electrode of the arrester, the element preferably comprises an electrically insulating material.

In a further embodiment, the element made of fusible material is also arranged between further elements of the surge arrester, such as, e.g., a ceramic insulation body, and the spring arm, with it always being ensured in the regular operating mode that the spring arm is at a distance from the outer electrodes of the arrester.

In the case of unacceptably strong heating of the surge arrester, the element made of fusible material fuses and the spring arm causes a short circuit between the outer electrodes and the central electrode or, in the case of 2-electrode arresters, between the outer electrodes. In the process, the pretensioned spring arm is pressed onto one of the outer electrodes of the arrester by spring tension. As a result, there is a direct electrical connection between the outer electrodes or the outer electrode and the central electrode of the arrester via the short-circuit device. The short circuit prevents further heating of the arrester, with damage as a result of further heating of the arrester being prevented.

In the case of unacceptably strong heating of the arrester, the latter is short circuited via the base element and at least one spring arm of the short-circuit device.

In one embodiment, the short-circuit device has two base elements. However, the short-circuit device may also have more than two base elements.

The base elements are interconnected via portions of the base element arranged thereon or via webs, with the portions preferably being arranged at the respective ends of the base elements.

In one embodiment, the two base elements, together with the portions situated therebetween, form a frame with a development in the form of an approximately closed quadrilateral. The four main sides of the quadrilateral are preferably arranged to form a rectangle. The corner regions of the rectangle may have chamfered sections in one embodiment.

In one embodiment, at least one spring arm is arranged between two base elements. However, a plurality of spring arms may also be arranged between the two base elements of the short-circuit device. The base elements and the spring elements can be arranged in any sequence with respect to one another, that is, also on the outside of the base element or elements.

In an embodiment with two base elements, the base elements are respectively connected to the central electrode, i.e., the first electrode of the arrester, in an electrically conductive and mechanically secured fashion.

In a preferred embodiment, the development of the short-circuit device has a rectangular external contour. The outline of the short-circuit device determined by the base element(s) and the spring arms should be understood to mean the external contour of the short-circuit device.

A rectangular external contour is advantageous during production, in particular, because hence only little or practically no scrap occurs during the production of the short-circuit device.

The material of the short-circuit device preferably contains copper beryllium. However, the short-circuit device may also consist of a different suitable material.

A short-circuit device, in which the spring arms extend over at least two neighboring electrodes of the arrester and in which the spring arms, including their connection webs, are freely resilient over their entire length, provides a comparatively long spring arm. A thin strip is preferably used as a spring arm in order to achieve a sufficiently good spring effect in the case of short spring arms. As a result of a relatively long length of the spring arm, secure short circuiting is possible if the spring arm is sufficiently thick. Hence, the contact pressure of the spring arm on the electrode of the arrester is sufficiently large for secure contacting in the illustrated embodiments, even if there should still be remains of the element made of fusible material in the contact gap between the spring arm and the electrode of the arrester.

Hence, the above-described short-circuit device has a large travel of the spring system in the case of a compact design.

BRIEF DESCRIPTION OF THE DRAWINGS

The above-described subject matters are described in more detail on the basis of the following figures and exemplary embodiments. The drawings described below should not be considered true to scale. Rather, individual dimensions can be illustrated in an enlarged, reduced or even distorted fashion for the purposes of an improved illustration. Elements that are alike or assume the same function have been denoted by the same reference sign.

Figure 1:
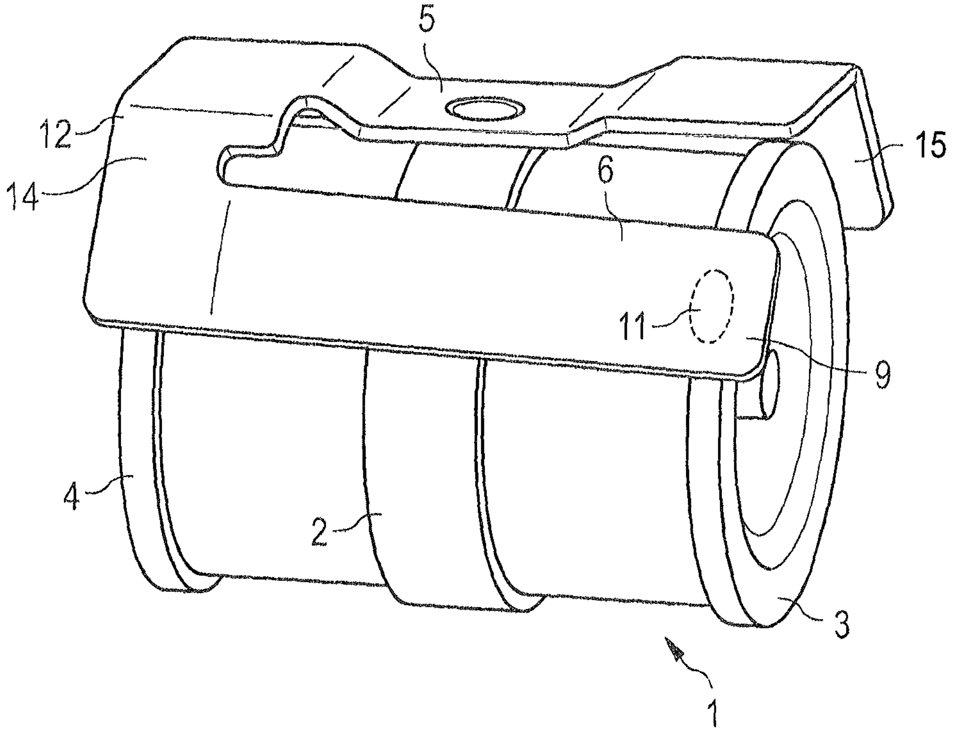
FIG. 1 shows an embodiment of the short-circuit device on a three-electrode arrester, wherein the short-circuit device has a base element and two spring arms.

The following list of reference symbols may be used in conjunction with the drawings:

1 (Surge) arrester
2 First electrode of the arrester 1
3 Second electrode of the arrester 1
4 Third electrode of the arrester 1
5, 8 Base element
6, 7 Spring arm
9, 10 Free end of the spring arm
11 Element made of fusible material
12, 13 Portion of the base element
14, 15 Web of the spring arm
16, 17 Hole in the portion of the base element

DETAILED DESCRIPTION OF ILLUSTRATIVE EMBODIMENTS

FIG. 1 shows a surge arrester 1 with a first embodiment of an external short-circuit device. The surge arrester 1 has three electrodes 2, 3, 4, wherein a first electrode 2 is designed as a central electrode and second 3 and third 4 electrodes are designed as outer or end electrodes. The surge arrester 1 has a preferably ceramic, gas-filled insulation body between the electrodes 2, 3, 4. In the illustrated embodiment, the short-circuit device has a base element 5 that is arranged centrally on the first electrode 2 in an electrically conductive and mechanically secured fashion, e.g., by soldering or welding. The base element 5 extends in the longitudinal direction of the surge arrester 1 up to the second 3 and third 4 electrode of the surge arrester 1, wherein the base element 5 is at a distance from the second electrode 3 and the third electrode 4 as a result of a bend in the end regions.

Respectively one spring arm 6, 7 is arranged at a distance to the second 3 and third 4 electrode of the surge arrester 1. The spring arms are parallel to and on both sides of the base element 5. The spring arms 6, 7 are connected to the base element 5 in a direct and integral fashion. One portion 12, 13 of the base element 5 and one web 14, 15 are respectively arranged between the actual, substantially strip-like, base element 5 and each spring arm 6, 7. Hence, an interspace or distance remains between the free region of the spring elements 6, 7 and the base element 5. The spring arms 6, 7 each have a free end 9, 10. The regions of the spring arms 6, 7 lying opposite to the free ends 9, 10 are connected to the base element 5, either directly or via webs or portions of the base element 5. The spring arms 6, 7 preferably extend over at least two neighboring electrodes 2, 3 or 2, 4 of the surge arrester 1.

The first spring arm 6 extends over all three electrodes and is at a distance from the electrodes 2, 3, 4 of the surge arrester 1, wherein the first spring arm 6 is, at its free end 9, pretensioned in the direction of the second electrode 3. An element 11 made of fusible material is arranged between the first spring arm 6 and the second electrode 3, which element is covered by the spring arm 6 in FIG. 1. In the embodiment illustrated in FIG. 1, the element 11 preferably comprises an electrically insulating material, such, as e.g., an easily fusible polymer. The second spring arm 7 is arranged on the base element in a centrosymmetric fashion with respect to the connection point of the base element to the first electrode and, like the first spring arm 6, is at a distance from the electrodes 2, 3, 4 of the surge arrester 1, wherein the second spring arm 7 is, in the region of its free end 10, pretensioned in the direction of the third electrode 4. An electrically insulating element 11 made of a fusible material is arranged between the second spring arm 7 and the third electrode 4.

In the case of unacceptably strong heating of the surge arrester 1, the element 11 between the spring arms 6, 7 and the second and third electrode, respectively, fuses and so the spring arms 6, 7 make contact with these electrodes and a short circuit is created between the base element 5, or first electrode 2, and the second 3 and/or third 4 electrode of the surge arrester 1. The short circuit between the electrodes prevents further heating of the surge arrester 1, and so the surge arrester 1 is protected against destruction.

Figure 2:
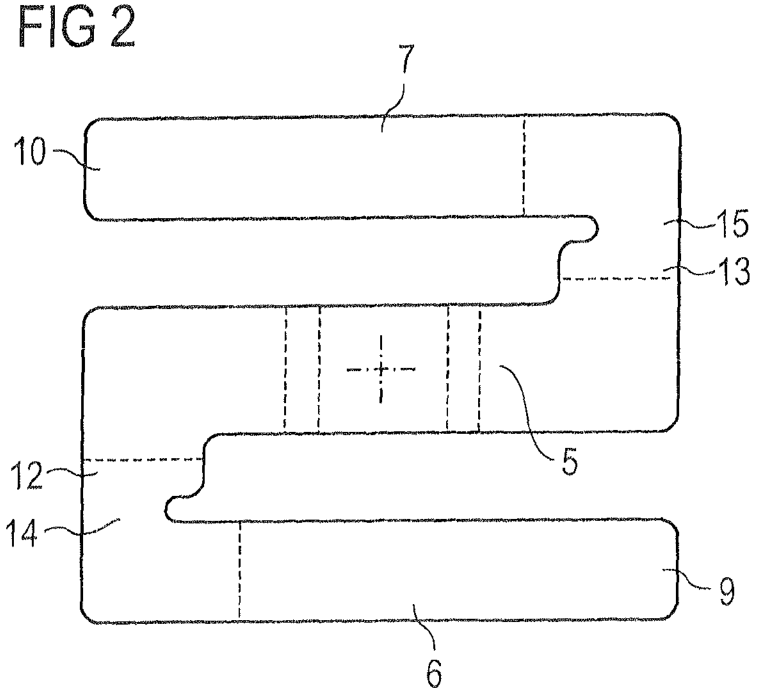
FIG. 2 schematically shows a development of the short-circuit device as per FIG. 1.

FIG. 2 schematically shows a planar development of the short-circuit device as per FIG. 1. The development has the central base element 5, from which two spring arms 6, 7 extend in opposite directions parallel to the base element 5. The first spring arm 6 is kept at a distance from the base element 5 by a portion 12 of the base element 5 and the web 14. In the illustrated embodiment, the first spring arm 6 extends parallel to the base element 5 up to the free end 9 of the former. Symmetrically with respect to this, the second spring arm 7 is, via a portion 13 of the base element 5 and the web 15, at a distance therefrom. In the illustrated embodiment, the second spring arm 7 extends parallel to the base element 5 up to the free end 10 of the former.

However, in a further embodiment (not illustrated), the two spring arms 6, 7 may also be arranged obliquely with respect to one another and/or obliquely with respect to the base element 5.

The development illustrated in FIG. 2 approximately corresponds to the unprocessed shape of the short-circuit device stamped out of a sheet. The dashed lines indicate edges along which the stamped unprocessed shape is bent such that the shape of the short-circuit device illustrated in FIG. 1 is formed. In the illustrated embodiment, the outline of the development approximately comprises a quadrilateral. Hence, little scrap is created during the production of the short-circuit device. Hence, the short-circuit device can be produced in a relatively simple and cost-effective fashion.

Figure 3:
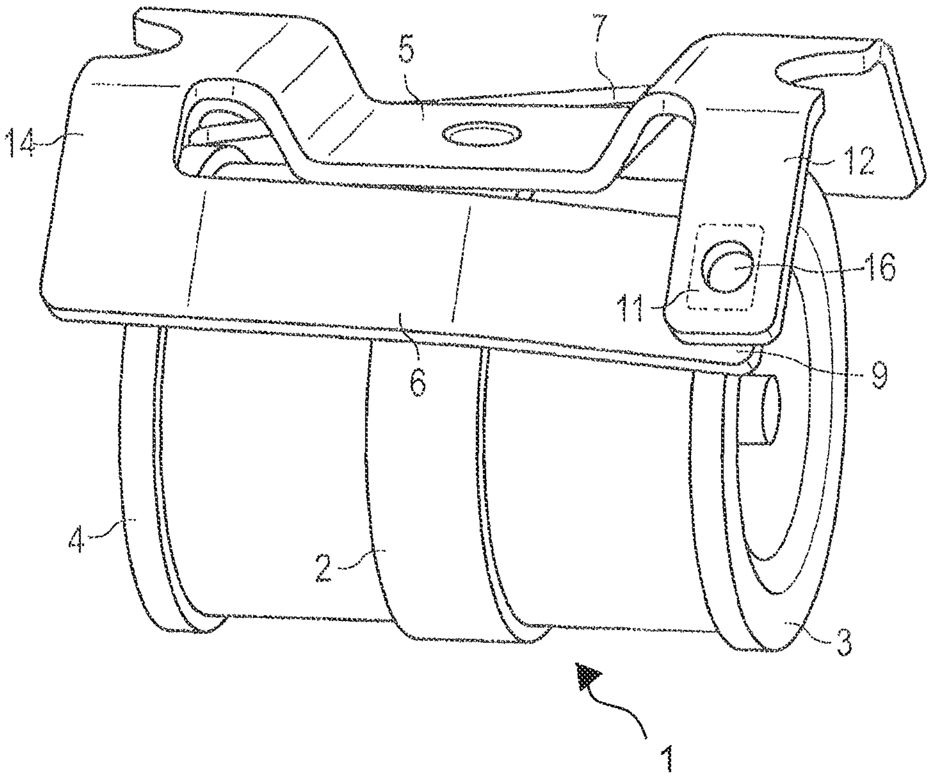
FIG. 3 shows an embodiment of the short-circuit device on a three-electrode surge arrester, in which the short-circuit device has a base element and two spring elements, wherein the base element has portions on which the spring arms are held by means of a fusible material.

FIG. 3 shows a further embodiment of a short-circuit device for the surge arrester 1 with three electrodes 2, 3, 4. The short-circuit device comprises a central base element 5, which is connected in an electrically conductive and mechanically secured fashion to the first electrode 2, the central electrode of the surge arrester 1. The short-circuit device comprises a first 6 and a second 7 spring arm on both sides of the base element 5 in the direction of the longitudinal axis of the surge arrester, which spring arms are aligned parallel to the base element 5 and at a distance therefrom in the lateral direction. The regions of the spring arms 6, 7 lying opposite the free ends 9, 10 are directly connected to the base element 5 via respective webs 14, 15. The spring arms 6, 7 are connected to the first electrode 2 of the surge arrester 1 in an electrically conductive fashion via the base element 5 of the short-circuit device.

In the regular operating mode, the first spring arm 6 is at a distance from the electrodes 2, 3, 4 of the surge arrester 1, wherein the first spring arm 6 is, at its free end 9, pretensioned in the direction of the second electrode 3. An element 11 made of fusible material is arranged between the first spring arm 6 and a portion 12 of the base element 5, which element is covered in FIG. 1 by the portion 12 of the base element 5. The element 11 made of fusible material keeps the spring arm 6 at a distance from the second electrode 3 of the arrester 1. In the embodiment illustrated in FIG. 1, the element 11 comprises a soft solder, for example. However, in a further embodiment, the element 11 made of a fusible material may also comprise a polymer or another suitable, easily fusible material.

In the embodiment illustrated in FIG. 3, it is irrelevant whether the element 11 is electrically conductive or insulating because the element 11 does not provide an indirect connection to the second 3 or third 4 electrode of the surge arrester 1.

In the regular operating state, the second spring arm 7 is, symmetrically thereto, at a distance from the electrodes 2, 3, 4 of the surge arrester 1, wherein the second spring arm 7 is, in the region of its free end 10, pretensioned in the direction of the third electrode 4. An element 11 made of fusible material is arranged between the second spring arm 7 and a portion 13 of the base element 5.

FIG. 3 shows the case of a malfunction in the short-circuit device, in which unacceptably strong heating of the surge arrester 1 has fused the elements 11 between the spring arms 6, 7 and the portions 12, 13 of the base element 5 such that, via the ends 9, 10 of the spring arms 6, 7 and the base element 5, there is a short circuit between the first electrode 2 and the second electrode 3 and/or third electrode 4 of the surge arrester 1.

Figure 4:
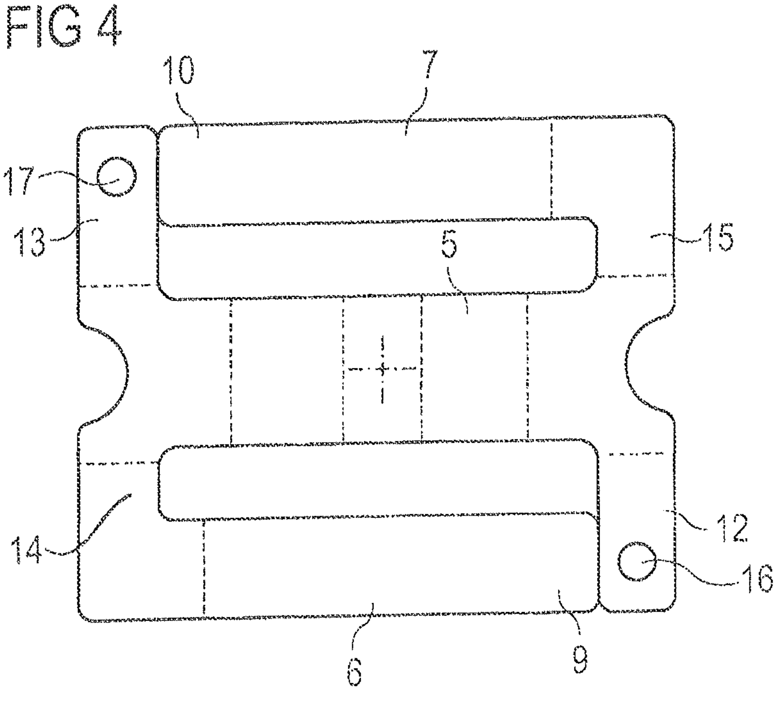
FIG. 4 shows the development as per the short-circuit device according to FIG. 3.

FIG. 4 schematically shows a planar development of the short-circuit device as per FIG. 3. The dashed lines indicate edges along which the stamped unprocessed shape is bent such that the shape of the short-circuit device illustrated in FIG. 3 is formed. The short-circuit device has a central base element 5, from which two spring arms 6, 7 extend in opposite directions parallel to the base element 5. Portions 12, 13 of the base element 5 are arranged in the region of the free ends 9, 10 of the spring arms 6, 7, which portions are aligned perpendicularly to the base element 5. The development illustrated in FIG. 4 approximately corresponds to the unprocessed shape of the short-circuit device stamped out of a sheet. In the illustrated embodiment, the outline of the development approximately corresponds to a quadrilateral, wherein the corner regions are chamfered. The holes 16, 17 serve to connect the portions 12 or 13 with the spring arms 6 or 7 by means of the element 11.

Figure 5:
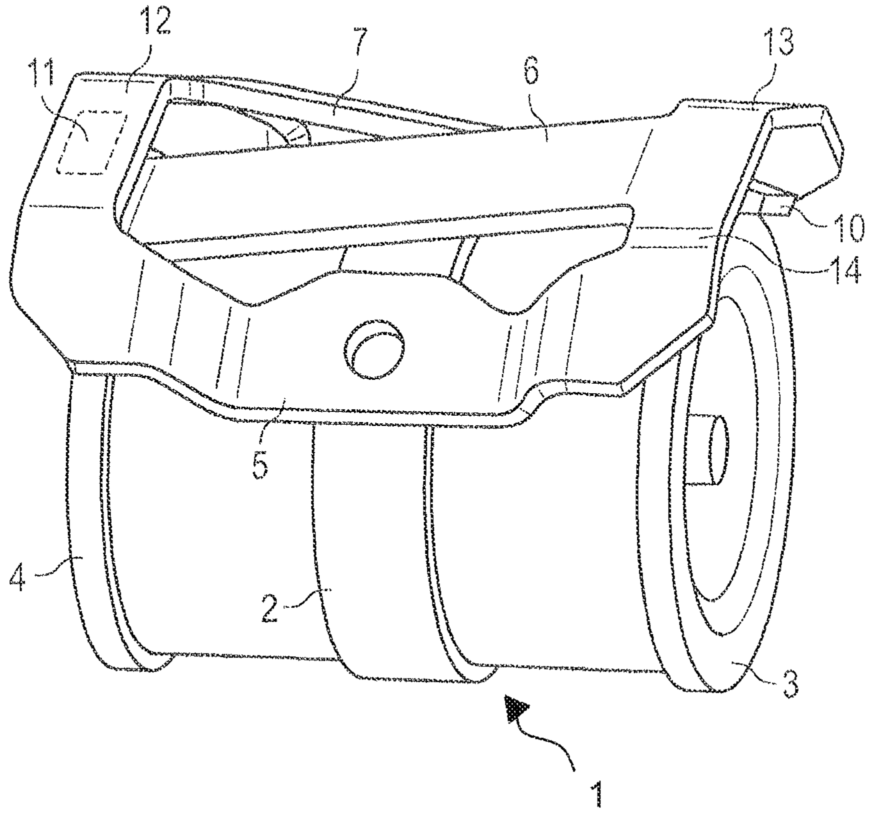
FIG. 5 shows an embodiment of the short-circuit device on a three-electrode surge arrester, in which the short-circuit device has two base elements and two spring arms.

FIG. 5 shows a further embodiment of a short-circuit device, which is arranged on a surge arrester 1 with three electrodes 2, 3, 4. In the illustrated embodiment, the short-circuit device comprises two base elements 5, 8 with two spring arms 6, 7 being arranged therebetween. The base elements 5, 8 are connected to the first electrode 2 of the surge arrester 1 in an electrically conductive and mechanically secured fashion, for example by soldering or by a welded connection. The spring arms 6, 7 are arranged parallel to one another and parallel with respect to the two base elements 5, 8. The two spring arms 6, 7 are directly connected to the base elements 5, 8 in an electrically conductive fashion, wherein the spring arms 6, 7 are at a distance from one another. The spring arms 6, 7 each have a free end 9, 10. The regions of the spring arms 6, 7 lying opposite to the free ends 9, 10 are directly connected to the base elements 5, 8 via respective webs 14, 15.

In the regular operating state, the first spring arm 6 is preferably at a distance from the electrodes 2, 3, 4 of the surge arrester 1, wherein the first spring arm 6 is, at its free end 9, pretensioned in the direction of the third electrode 4. An element 11 made of fusible material is arranged between the first spring arm 6 and a portion 12 of the base element 5. In the embodiment illustrated in FIG. 5, the element 11, for example, comprises a soft solder. Like the first spring arm 6, the second spring arm 7 is at a distance from the electrodes 2, 3, 4 of the surge arrester 1 in the regular operating state, wherein the second spring arm 7 is, in the region of its free end 10, pretensioned in the direction of the second electrode 3. An element 11 made of fusible material is arranged between the second spring arm 7 and a portion 13 of the base element 8.

FIG. 5 shows the state of the short-circuit device in the case of a malfunction, in which unacceptably strong heating of the surge arrester 1 has fused the element 11 between the spring arms 6, 7 and the portions 12, 13 of the base elements 5, 8, and so, via the spring arms 6, 7 and the base elements 5, 8, there is a short circuit between the first 2 and the second 3 or third 4 electrode of the surge arrester 1.

Figure 6:
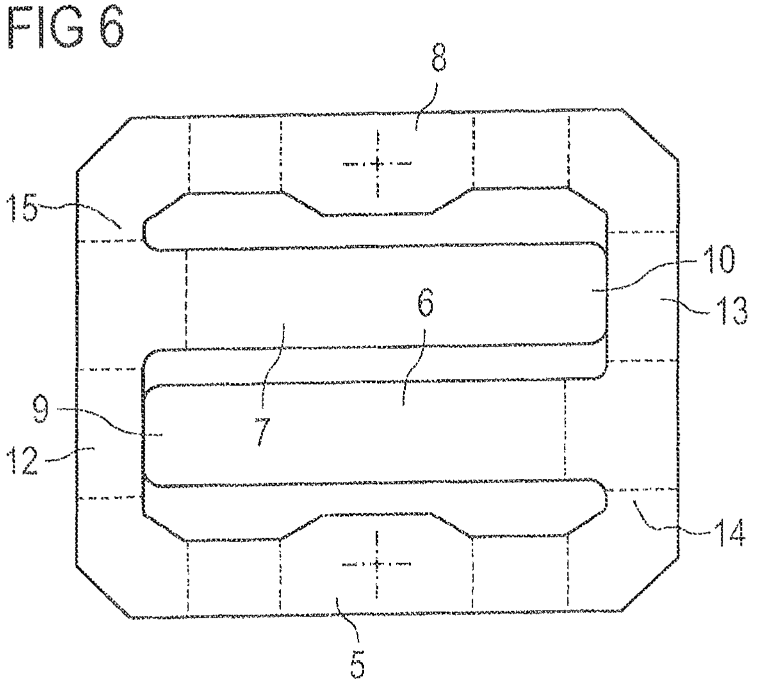
FIG. 6 schematically shows the development as per the short-circuit device according to FIG. 5.

FIG. 6 schematically shows the development of the short-circuit device as per the short-circuit device illustrated in FIG. 5. The development has a closed region with two base elements 5, 8, which are interconnected via portions 12, 13. Two spring arms 6, 7 are arranged between the base elements 5, 8, which spring arms are connected to the base elements 5, 8, respectively via a web 14, 15, and to the base elements 8, 5, respectively via the portions 12, 13. In the region of the free ends 9, 10 of the spring arms 6, 7, the latter are separated from the portions 12, 13 of the base elements 5, 8 and have no connections such that the spring arms 6, 7 can freely move upward and/or downward at their free ends 9, 10. The dashed lines in FIG. 6 represent edges by means of which the short-circuit device can be brought into the desired shape. On the upper and/or lower side of the material, the edges can be formed by recesses in the initial material, and so there can be simpler processing of the short-circuit device during the subsequent shaping.

Although only a limited number of possible developments of the invention could be described in the exemplary embodiments, the invention is not restricted to these. In principle, the short-circuit device can comprise a number of base elements, which are, for example, arranged between a number of spring arms.

The description of the subject matter specified here is not restricted to the individual special embodiments, rather, the features of the individual embodiments may be combined as desired, provided this is expedient from a technical point of view. Thus, the short-circuit device can also be embodied for 2-electrode surge arresters. The base element is then fixedly connected to one of the two electrodes.

What is claimed is:

1. A surge arrester having a short-circuit device, the short-circuit device comprising:

at least one base element that extends over an entire length of the surge arrester and is connected to a first electrode of the surge arrester in an electrically conductive and mechanically secured fashion; and at least one spring arm that extends parallel to the at least one base element, the at least one spring arm including a connecting portion that is integral with a connecting portion of the at least one base element, the at least one spring arm also including a free end at a distance from the at least one base element, the free end extending over at least two neighboring electrodes of the surge arrester such that the connecting portion is the only portion of the free end that is mechanically connected to the at least one base element.

2. The short-circuit device according to claim 1, wherein the at least one spring arm comprises two spring arms having free ends that extend in opposing directions.

3. The short-circuit device according to claim 2, wherein a first spring arm of the two spring arms is at a distance from a second electrode of the surge arrester and is pretensioned in a direction of the second electrode.

4. The short-circuit device according to claim 3, wherein a second spring arm of the two spring arms is at a distance from a third electrode of the surge arrester and is pretensioned in a direction of the third electrode.

5. The short-circuit device according to claim 1, wherein the at least one spring arm in a region of its free end is at a distance from at least one electrode of the surge arrester as a result of an element made of a material that fuses easily.

6. The short-circuit device according to claim 5, wherein the element comprises a fusible, electrically conductive material.

7. The short-circuit device according to claim 5, wherein the element comprises a fusible, electrically insulating material.

8. The short-circuit device according to claim 7, wherein the fusible material is arranged between the at least one spring arm and a portion of the at least one base element.

9. The short-circuit device according to claim 7, wherein the element made of the fusible material is arranged between an end-region of the spring arm and an electrode of the surge arrester.

10. The short-circuit device according to claim 1, wherein the surge arrester is short circuited by the at least one base element and the at least one spring arm in a case of unacceptably strong heating.

11. The short-circuit device according to claim 1, wherein the short-circuit device has an approximately rectangular external contour.

12. The short-circuit device according to claim 1, wherein the at least one base element comprises base elements that are connected to the first electrode of the surge arrester by a welded connection.

13. The short-circuit device according to claim 1, wherein the at least one base element comprises two base elements.

14. A surge arrester having a short-circuit device, the short-circuit device comprising:

a first base element that extends over an entire length of the surge arrester and is connected to a first electrode of the surge arrester in an electrically conductive and mechanically secured fashion;

a second base element that extends over the entire length of the surge arrester and is connected to the first electrode of the surge arrester in an electrically conductive and mechanically secured fashion; and at least one spring arm is arranged between and electrically connected to the first and second base elements, a free end of the at least one spring arm being at a distance from the first and second base elements and extending over at least two neighboring electrodes of the surge arrester.

15. The short-circuit device according to claim 1, wherein the short-circuit device comprises copper beryllium.

16. An electrical device comprising:

a surge arrester having a substantially cylindrical shape, the surge arrester including a first electrode and a second electrode that each extend around a perimeter of the surge arrester;

a base element comprising a continuous piece that extends over an entire length of the surge arrester and is connected to the first electrode of the surge arrester in an electrically conductive and mechanically secured fashion, the length orthogonal to the perimeter; and a spring arm arranged on the base element, the spring arm having a free end at a distance from the base element, spring arm extending over at least the first and second electrodes of the surge arrester.

17. The electrical device according to claim 16, further comprising a second spring arm arranged on the base element, wherein free ends of the spring arm and the second spring arm extend in opposing directions.

18. The electrical device according to claim 17, wherein the spring arm is at a distance from the second electrode of the surge arrester and is pretensioned in a direction of the second electrode; and wherein the second spring arm is at a distance from a third electrode of the surge arrester and is pretensioned in a direction of a third electrode of the surge arrestor.

19. The electrical device according to claim 17, further comprising a fusible material disposed between the free end of the spring arm and the second electrode.

20. A surge arrester having a short-circuit device, the short-circuit device comprising:

at least one base element that extends over an entire length of the surge arrester and is connected to a first electrode of the surge arrester in an electrically conductive and mechanically secured fashion;

at least one spring arm arranged on the at least one base element, a free end of the at least one spring arm being at a distance from the at least one base element and extending over at least two neighboring electrodes of the surge arrester; and a fusible, electrically conductive material, wherein the at least one spring arm in a region of its free end is at a distance from at least one electrode of the surge arrester as a result of the fusible material, wherein the fusible material is arranged between the at least one spring arm and a portion of the at least one base element.

* * * * *